Figure 1:
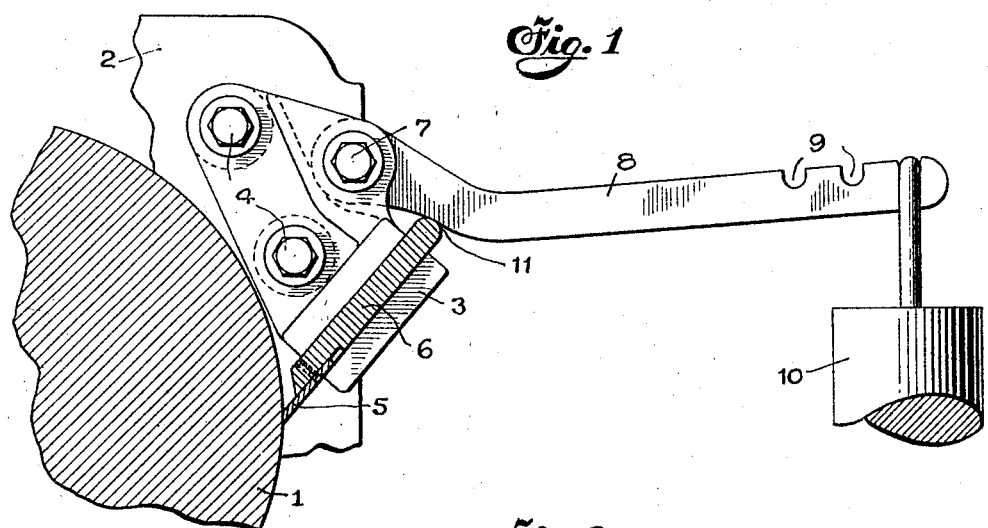

H. BRUNNER.
SCRAPER.
APPLICATION FILED DEC. 23, 1919.

1,411,907.

Patented Apr. 4, 1922.

Inventor
Hans Brunner
By his Attorneys
Emery Varney Blain & Hoyuet

UNITED STATES PATENT OFFICE.

HANS BRUNNER, OF TRENTON, NEW JERSEY, ASSIGNOR TO ESSEX RUBBER COMPANY, OF TRENTON, NEW JERSEY, A CORPORATION OF NEW JERSEY.

SCRAPER.

1,411,907. Specification of Letters Patent. Patented Apr. 4, 1922.

Application filed December 23, 1919. Serial No. 346,945.

*To all whom it may concern:*

Be it known that I, HANS BRUNNER, a citizen of Switzerland, and a resident of Trenton, in the county of Mercer and State of New Jersey, have invented an Improvement in Scrapers, of which the following is a specification.

This invention relates to a scraper which is applied to remove a commodity from a roller and which is easily adjustable and bears with a uniform pressure across the width of the roller.

One of the objects of this invention is to provide a scraper to be applied to a roller which will thoroughly and efficiently remove a commodity therefrom and when worn will not automatically change its position with respect to the roller and will at all times exert a uniform pressure.

This invention possesses many other and advantageous features, some of which, together with the foregoing, will be set out more at length in the following description wherein will be outlined in full the preferred embodiment of that form of the invention which has been selected for illustration in the drawings accompanying and forming a part of the present specification, wherein—

Figure 2:
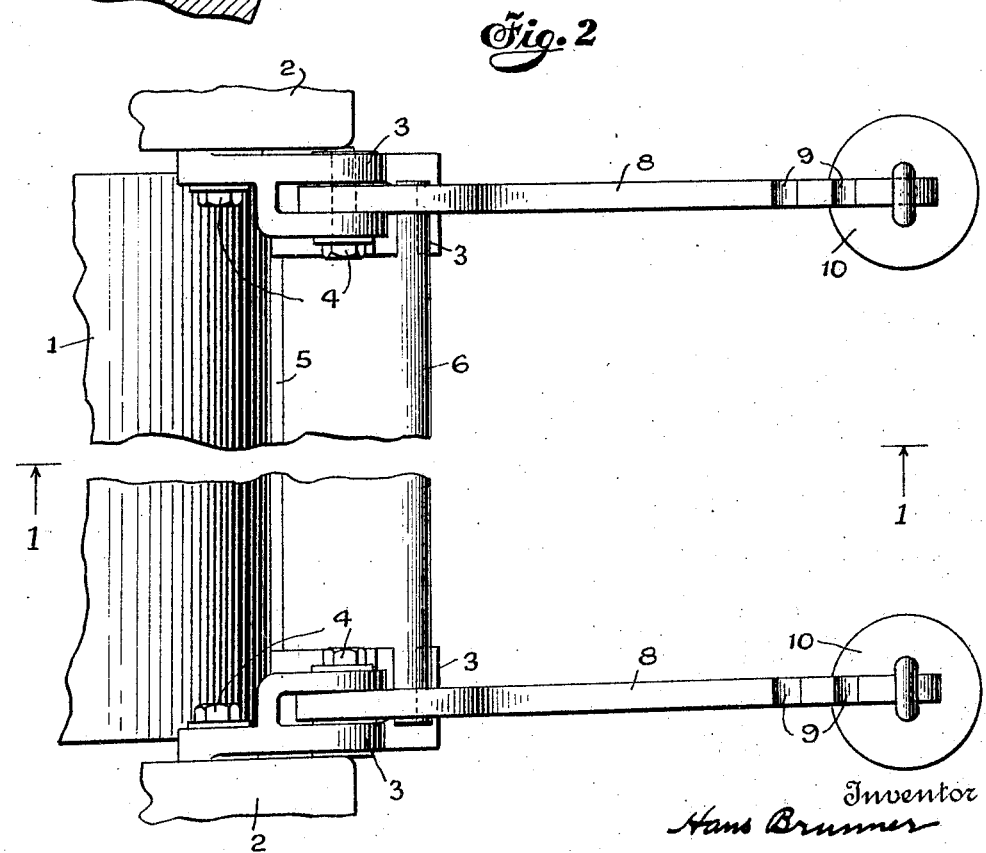

Figure 1 is a view partly in section of the roller, the scraper, and its holding and feeding mechanism, and Figure 2 is a top plan view of a roller showing in particular the scraper and part of the roller.

In preparing rubber and its various compounds, one of the steps is to have the compound pass between two rollers which form the material into a thin sheet. In removing this sheet from the roller two types of scrapers have been employed, one of the types being pivoted on the frame carrying the rollers and the other type being one wherein the scraper moves in its holder. The scraper of the first type upon becoming worn is caught by the roller and "carried through" thereby cutting the roller and breaking the scraper holder. The objection to the other type of scraper is that one or more attendants must be present practically at all times to adjust the pressure upon the scraper.

The improvement of the scraper as set forth in this disclosure and the drawings provides a scraper which is maintained against the surface of the roller or rotating member at all times and one which automatically exerts a substantially uniform pressure of the scraper against the surface of the roller and across its width. Referring to Figure 1, the roller 1 is shown in section and as being supported by frame 2 which is shown only in part. Attached to frame 2 at both ends of the roller are the holders 3 which are fastened to the frame by any suitable means here shown as by bolts 4. These holders may be of unit form which extends the whole width of the roller. The holders have longitudinal slots in which the scraper blade 5 with its carrier 6 can move to and from the roller. Pivoted at 7 is an arm 8 having notches 9 for receiving weight 10. This arm bears on the scraper carrier at 11 and keeps the carrier in constant contact with the roller. The apparatus is provided with two arms 8 and necessary weights, and preferably one arm is located on one side of the roller and the other arm on the other side so that they press downward on the two ends of the scraper carrier and cause a uniform pressure of the scraper against the roller and the weights may be increased or decreased or set in the various notches on the arms 8 so that varied pressures may be maintained on the scraper.

The rubber or its compound in passing between the two rollers is formed into a sheet resembling a piece of cloth and this sheet should be removed from the roller without seriously injuring its structure. By applying the apparatus herein described the sheet is removed without injury thereto, and as the scraper 5 wears there is no danger of its being caught by the roller and "carried through" as the only relative movement the scraper has is to and from the roller in the holder and does not follow the circumference of the roller as is the case in one of the other types of scrapers. By means of applying the pressure at both ends of the scraper the uniform pressure across the width of the roller is maintained and therefore the sheet is scraped from the roller without being punctured or caught by the scraper should the adjustment not be exactly proper. Modifications of the apparatus which automatically cause a uniform pressure of the scraper are considered to be within the scope of this invention. The disclosure herein made is to apparatus which efficiently performs the function of removing a sheet from the roller which does not require special attendants and which will not injure the machinery as the scraper wears.

It will be understood that the embodiment of the invention herein described and shown in the accompanying drawings may be variously modified, and that the present invention is susceptible of different embodiments. In so far as such modifications and embodiments of the invention come within the scope of the following claims they are considered to be within the scope of the invention.

I claim:

1. In an apparatus of the class described the combination of a rotating member, a frame supporting said member, a holder having a longitudinal opening attached to said frame, a scraper held by said holder and adapted to move to and from said rotating member in a plane, a pivoted arm contacting with said scraper and supporting a weight on its free end for forcing said scraper against said member.

2. In an apparatus of the character described the combination of a rotating member, a holder having a longitudinal opening therein and held adjacent to said member, a scraper adapted to contact with said rotating member, a carrier slidably held in said holder and adapted to carry said scraper, pivoted arms contacting with said carrier and having weights on their free ends.

In testimony whereof, I have signed my name to this specification this twentieth day of December, 1919.

HANS BRUNNER.